United States Patent
Hosokawa (10) Patent No.: US 8,447,558 B2
(45) Date of Patent: May 21, 2013

(54) INFORMATION PROCESSOR AND COOLING PERFORMANCE DETERMINATION METHOD

(75) Inventor: Daisuke Hosokawa, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 530 days.

(21) Appl. No.: 12/645,365

(22) Filed: Dec. 22, 2009

(65) Prior Publication Data

US 2010/0169039 A1    Jul. 1, 2010

(30) Foreign Application Priority Data

Dec. 25, 2008   (JP) ................................. 2008-331339

(51) Int. Cl.
*G01K 1/00*   (2006.01)
*G01K 3/00*   (2006.01)
*G01K 13/00*  (2006.01)
*H05K 7/20*   (2006.01)

(52) U.S. Cl.
USPC ...... 702/136; 702/130; 361/679.54; 361/718; 361/719; 700/300

(58) Field of Classification Search
USPC ................. 702/130, 136; 361/679.54, 718, 361/719; 700/300
See application file for complete search history.

(56) References Cited

U.S. PATENT DOCUMENTS

| | | | | |
|---|---|---|---|---|
| 5,991,153 A | * | 11/1999 | Heady et al. | 361/704 |
| 2005/0046991 A1 | | 3/2005 | Nakazato | |
| 2007/0266716 A1 | * | 11/2007 | Klein et al. | 62/129 |
| 2008/0208513 A1 | * | 8/2008 | Dupuy et al. | 702/132 |

FOREIGN PATENT DOCUMENTS

| | | |
|---|---|---|
| JP | H02-123413 A | 5/1990 |
| JP | H08-95672 A | 4/1996 |
| JP | 2001-022451 A | 1/2001 |
| JP | 2004-355421 A | 12/2004 |
| JP | 2005-078320 A | 3/2005 |
| JP | 2006-293814 A | 10/2006 |
| WO | WO2006/108444 | * 10/2006 |

OTHER PUBLICATIONS

Explanation of Non-English Language References.
Notice of Reasons for Rejection mailed by the Japan Patent Office on Mar. 2, 2010 in corresponding Japanese Patent App. No. 2008-331339 in 6 pages.

* cited by examiner

*Primary Examiner* — Janet Suglo
(74) *Attorney, Agent, or Firm* — Knobbe, Martens, Olson & Bear, LLP (57) ABSTRACT

According to one embodiment, an information processing apparatus, includes a heat generator on the printed-circuit board in the housing, a heat radiator in the housing configured to radiate heat of the heat generator to the outside of the housing, a first thermometer configure to sense a first temperature at a first position on the board, a second thermometer on the board configured to sense a second temperature at a second position away from the heat generator than the first position, a cooling performance determination module configured to monitor whether a temperature difference between the first temperature and the second temperature is above a threshold, and to determine whether performance of the heat radiator is deteriorated based on a result of the monitoring.

9 Claims, 9 Drawing Sheets

INFORMATION PROCESSOR AND COOLING PERFORMANCE DETERMINATION METHOD

CROSS-REFERENCE TO RELATED APPLICATIONS

This application is based upon and claims the benefit of priority from Japanese Patent Application No. 2008-331339, filed Dec. 25, 2008, the entire contents of which are incorporated herein by reference.

BACKGROUND

1. Field

This invention relates generally to an information processor such as a personal computer. More specifically, the present invention relates to an information processor equipped with a heat radiation module and to a cooling performance determination method.

2. Description of the Related Art

In recent years, various laptop type or desktop type portable personal computers have been developed. Computers of this kind are each equipped, for example, with heat generation devices such as CPUs, display controllers, hard disk drives and bus bridge devices.

In terms of a cooling mechanism for cooling the heat generation device, a heat radiation module using a fan or a heat radiation fin (heat sink) is well known.

A temperature controller, which reduces a load on a heat source down to a first predetermined load, if a housing surface temperature, being measured during detection of touching of a human body, is higher than a first predetermined surface temperature, is disclosed in Jpn. Pat. Appln. KOKAI Publication 2006-293814.

Meanwhile, a load on an information processor such as a computer is seriously varied in accordance with content of processing of an execution object. With the load variations, the temperatures in the vicinity of the heat generation device also vary. For instance, if the load on the computer increases quickly, heat which surpasses the heat radiation performance by the heat radiation module is generated by the heat generation device, thereby, the temperatures in the vicinity of the heat generation device rise temporarily. After this, the radiate of the heat through the heat radiation module is advanced, the temperatures in the vicinity of the heat generation device fall within a certain temperature range. Thus, the temperatures in the vicinity of the heat generation device vary in accordance with the load variations.

Therefore, if it is simply determined the presence or absence of deterioration in the performance of the heat radiation module only by a comparison result between the temperature of the outside and the inside of the information processor, there is some possibility of erroneously determining the temporal increase in the load as the deterioration in the performance of the heat generation module.

Usually, to perform performance measurement of the heat generation module, it is needed for a user himself or herself to start an inspection program dedicated to the performance measurement of the heat generation module.

In this case, although the performance of the heat generation module during a specified time period in which the inspection program is executed, it is impossible to measure the performance of the heat generation module in a normal operation state of a computer in which the inspection program is not executed. To correctly determine whether or not the heat radiation module fully functions, it is needed to continuously measure the performance of the heat generation module during a normal operation period of the computer.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an information processing apparatus, comprises a housing, a printed-circuit board in the housing, a heat generator on the printed-circuit board, a heat radiator in the housing configured to radiate heat of the heat generator to the outside of the housing, a first thermometer in the housing configure to sense a first temperature at a first position on the printed-circuit board, a second thermometer configured to sense a second temperature at a second position on the printed-circuit board away from the heat generator than the first position, a temperature difference processor configured to compute a temperature difference between the first temperature and the second temperature, and a cooling performance determination module configured to monitor the temperature difference is above a threshold, and to determine whether performance of the heat radiator is deteriorated based on a result of the monitoring, wherein the threshold value is any one of the temperature difference computed when a measured temperature of the housing is in a predetermined high range, the temperature difference computed when power consumption of the heat generator is substantially high, and the temperature difference computed when a temperature of the heat generator is beyond a predetermined normal operating limit temperature.

Hereinafter, embodiments of the invention will be described with reference to the drawings.

[First Embodiment]

A configuration of an information processor regarding a first embodiment of the invention will be described with reference to FIG. 1. The information processor is realized as a notebook type personal computer 10 of a battery driven portable type.

Figure 1:
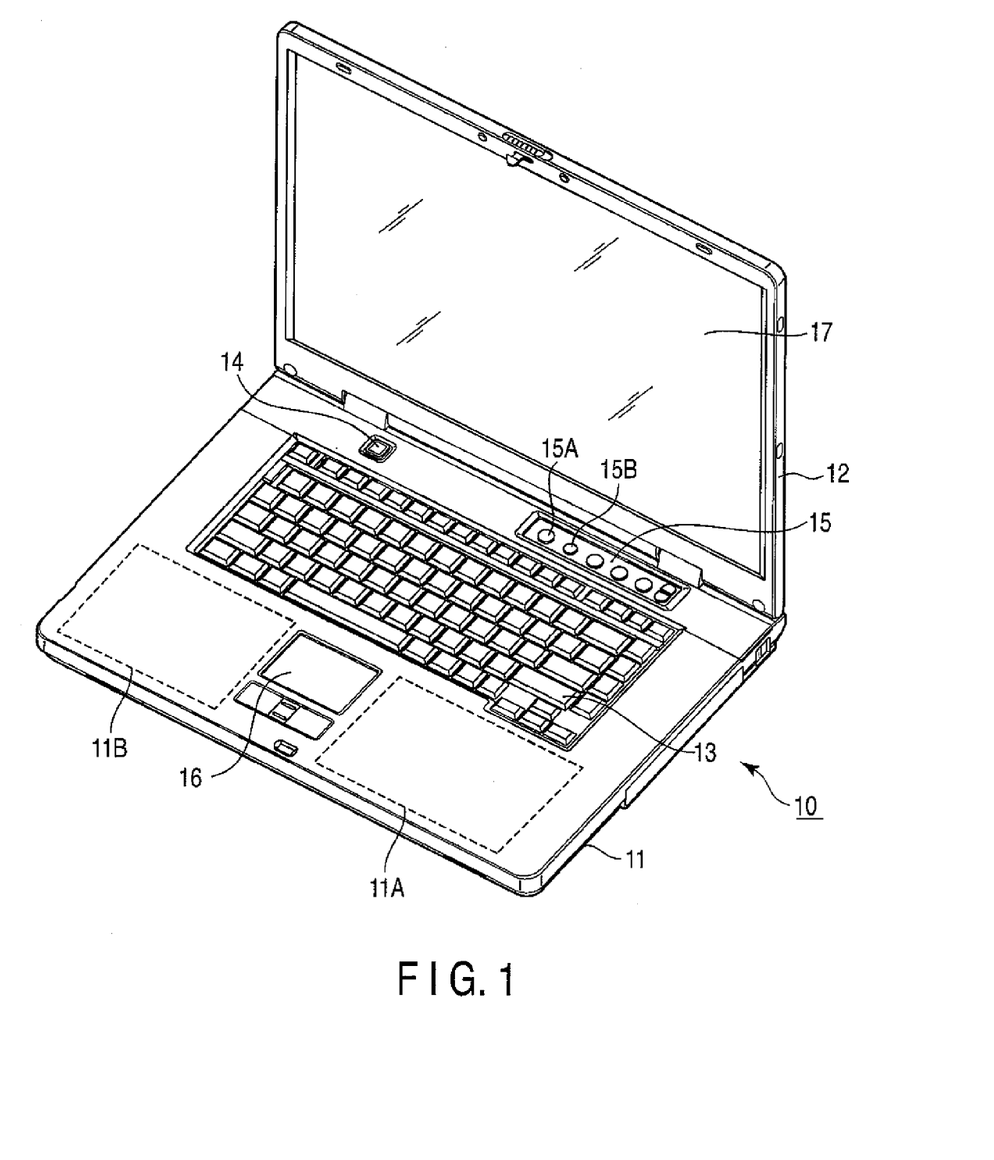
FIG. 1 is an exemplary perspective view depicting an appearance which is viewed from the front of an information processor regarding a first embodiment of the invention.

FIG. 1 shows a perspective view of the computer 10 viewed from a front sided in a state where its display unit is open.

The computer 10 comprises a housing 11 as a main unit, and a display unit 12. A display device consisting of a liquid crystal display (LCD) 17 is installed in the display unit 12, and the display screen of the LCD 17 is positioned at the approximately center of the display unit 12.

The display unit 12 is supported by the housing 11, and is attached so as to freely rotate between an open position at which the upper face of the housing 11 is exposed and a closed position by which the upper face thereof is covered. A printed-circuit board is disposed in the housing 11, and various heat generation devices such as a CPU, a display controller, a hard disk drive, and a bus bridge device are mounted on the circuit board.

A keyboard (KB) 13, a power button 14 for turning on or off the computer 10, an input operation panel 15 and a touch pad 16, etc., are arranged on the upper face of the housing 11.

The operation panel 15 is an input device for inputting an event corresponding to a pressed button, and has a plurality of buttons for starting a plurality of functions, respectively. Buttons 15A, 15B for starting specified application, respectively, are included in the group of the plurality of buttons.

Areas 11A, 11B on this side of the KB 13 disposed on the upper face of the housing 11 are so-called palm rests, and when a user uses the KB 13; the palms of the user are put thereon.

Figure 2:
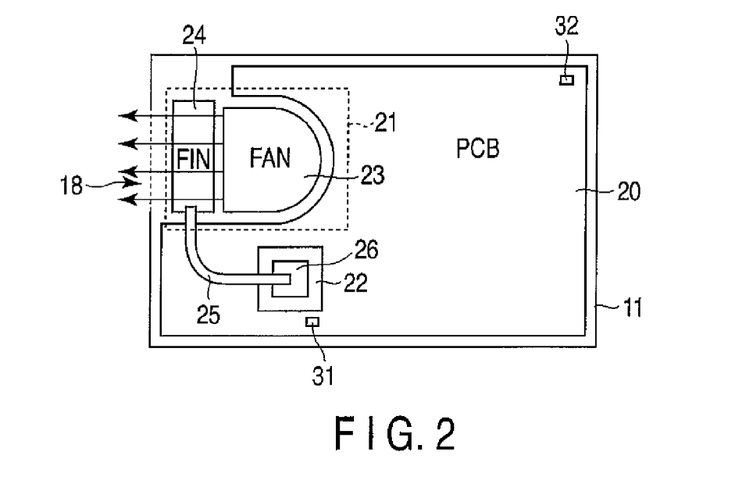
FIG. 2 is an exemplary block diagram for explaining a cooling mechanism which is mounted on the information processor regarding the first embodiment of the invention.

FIG. 2 shows an example of a cooling mechanism installed in the housing 11. As shown in FIG. 2, a heat radiation module 21, a heat generation device 22, temperature sensors 31, 32 are installed in the housing 11.

The heat generation device 22 is, for example, a device such as a CPU, a display controller, a hard disk drive, and a bus bridge device. The heat generation device 22 is mounted on a printed-circuit board (PCB) 20 installed in the housing 11. The PCB 20 is a so-called mother board on which various electronic components consisting of the computer 10 are mounted.

The heat radiation module 21 radiates the heat, which is generated by the heat generation device 22 that is a cooling object, to the outside.

The radiation module 21 comprises, for example, a fan 23, and a heat radiation fin (also referred to as a heat sink) 24. An exhaust air port 18 is disposed on one side wall of the housing 11. An inlet air port (not shown) is disposed, for example, on the other side wall of the housing 11. The heat radiation fin 24 is disposed at a position in the housing 11 facing the exhaust air port 18. That is, the heat radiation fin 24 is disposed at the position near the exhaust air port 18 so as to face the exhaust air port 18. The heat radiation fin 24 is thermally connected to the heat generation device 22 via a heat reception unit, etc. More specifically, the heat radiation fin 24 is thermally connected to the heat generation device 22 through a heat pipe 25 and a heat reception unit 26.

The fan 23 is a cooling fan configured to cool the heat radiation fin 24, and is arranged near the heat radiation fin 24. The fan 23 radiate the heat generated by the heat generation device 22 via the exhaust air port 18 to the outside by air-cooling the heat radiation fin 24 thermally connected to the heat generation device 22.

Temperature sensors 31, 32 are mounted on the PCB 20. Each of the temperature sensors 31, 32 is composed, for example, of a thermistor or a dedicated temperature sensing IC mounted on the PCB 20.

The temperature sensor 31 is used for sensing the surrounding temperature of the heat radiation device 22. More specifically, the temperature sensor 31 functions as a first temperature sensor configured to sense the temperature (a board temperature near the heat radiation device 22) at a first position, on the PCB 20, which is positioned near the heat generation device 22. The temperature sensor 31 is positioned at the first position on the PCB 20, and is used for observing influence of the board temperature due to the heat generated by the heat generation device 22. When an abnormality occurs in the heat radiation module 21, an amount of heat transferring from the heat radiation device 22 to the heat radiation module 21 is reduced. As a result, the heat generated by the heat generation device 22 transfers to the PCB 20, and the temperature at the first position on the PCB 20 positioned near the heat generation device 22 rises. The temperature at the first position on the PCB 20 is sensed by the temperature sensor 31. That is, the temperature sensor 31 functions as a sensor for sensing the temperature rise caused by the abnormality in the heat radiation module 21.

The temperature sensor 32 is a second temperature sensor configured to sense the temperature (temperature in housing) at a second position, which is farther away from the heat generation device 22 than the first position, on the PCB 20. More specifically, the temperature sensor 32 is arranged at an end part, on the PCB 20, where the temperature sensor 32 is hardly affected by the heat generated by the heat generation device 22. The heat generation device 22 is arranged at a position deviated to one side wall from a center position in the housing 11. In this case, the temperature sensor 32 may be arranged at a position deviated to the other side wall facing the one side wall. As shown in FIG. 2, if the heat generation device 22 is arranged at one corner part in the housing 11, the temperature sensor 32 may be arranged at the other corner part away from the one corner part in an opposite angle direction.

The temperature at the second position on the PCB 20 to be sensed by the temperature sensor 32 is used as a reference temperature for evaluating the temperature (board temperature near the heat generation device 22) at the first position on the PCB 20 sensed by the temperature sensor 31.

Figure 3:
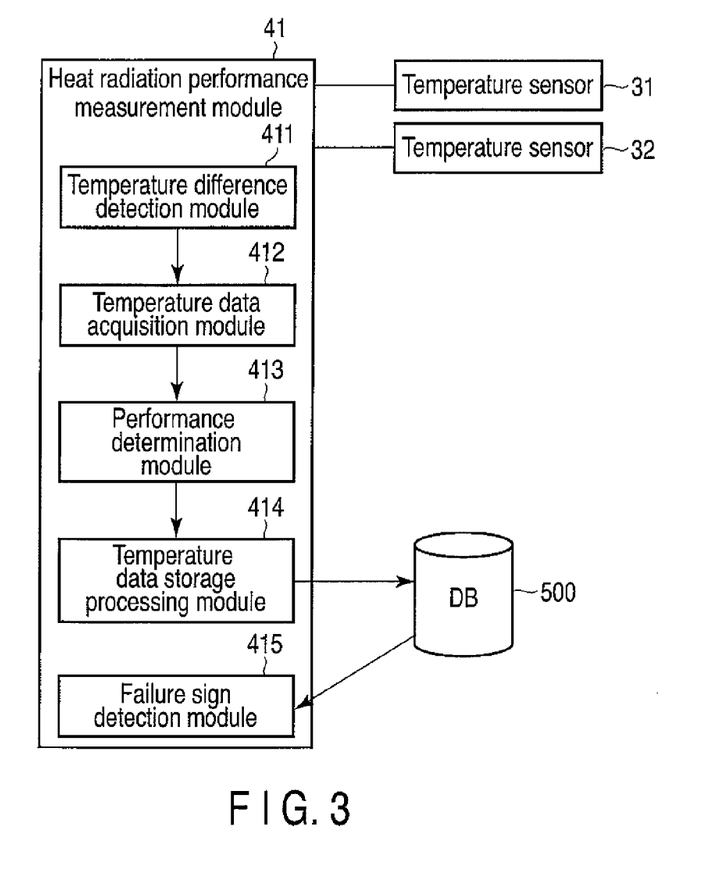
FIG. 3 is an exemplary block diagram depicting a configuration of a heat radiation performance measurement unit which is mounted on the processor regarding the first embodiment of the invention.

Next, a configuration of a heat radiation performance measurement unit 41 disposed in the computer 10 will be described with reference to FIG. 3.

The measurement unit 41 is installed in the housing 11. The measurement unit 41 measures the performance of the heat radiation module 21 by using the temperature sensors 31, 32.

The measurement unit 41 comprises a temperature difference detection unit 411, a temperature data acquisition unit 412, a performance determination unit 413, a temperature data storage processing unit 414 and a failure sign detection unit 415.

The detection unit 411 detects a temperature difference $\Delta T$ obtained by subtracting a temperature (Tref) sensed by the temperature sensor 32 for a temperature (T1) sensed by the temperature sensor 31.

The determination unit 413 is started when the temperature difference $\Delta T$ detected by the detection unit 411 exceeds a specified threshold TH. The determination unit 413 continuously executes monitor processing for monitoring the temperature difference $\Delta T$ between the temperature (T1) sensed by the temperature sensor 31 and the temperature (Tref) sensed by the temperature sensor 32 during a fixed period from a time point when the temperature difference $\Delta T$ exceeds the threshold TH, and determines whether or not the performance of the heat radiation module 21 is deteriorated on the basis of the result from the monitor processing.

In the monitor processing, the determination unit 413 executes acquisition processing for acquiring pairs of first temperature sample values indicating board temperatures near the heat generation device 22 to be sensed by the temperature sensor 31 and of second temperature sample values indicating housing inside temperatures to be sensed by the temperature sensor 32. The acquisition processing is repeatedly executed at fixed time intervals (e.g., three-second intervals) during the fixed time period. The determination unit 413 determines whether or not the performance of the heat radiation module 21 is deteriorated on the basis of the pair groups acquired during the fixed period. In this case, the determination unit 413 can determine whether or not the performance of the heat radiation module 21 is deteriorated on the basis of the number of pairs of which the differences subtracting the second temperature sample values from the first temperature sample values exceed a reference value K.

More specifically, the performance determination unit 413 calculates the difference $\Delta T$ between the first temperature sample value (T1) and the second temperature sample value (Tref) for each pair acquired during the fixed time period, and calculates the number of pairs satisfying a condition that the temperature difference $\Delta T$ exceeds the reference value K. Among the pair groups acquired during the fixed time period, if the pairs, which satisfy the condition that temperature difference $\Delta T$ exceeds the reference value K, exist more than a certain reference number; the determination unit 413 determines that the performance of the heat radiation module 21 is deteriorated. As for the reference value K, a value which is larger than the threshold value TH may be used.

In the monitor processing, the foregoing acquisition processing may be executed on the condition that the temperature difference $\Delta T$ exceeds the threshold TH. In this case, the determination unit 413 determines whether or not the temperature difference $\Delta T$ exceeds the threshold TH for each three-minute sampling timing. If the temperature difference $\Delta T$ exceeds the threshold TH, the determination unit 413 executes the acquisition processing for acquiring pairs of the first temperature sample value indicating a board temperature near the heat generation device to be sensed by the temperature sensor 31 and the second temperature sample value indicating the temperature of the inside of the housing to be sensed by the temperature sensor 32. Conversely, if the temperature difference $\Delta T$ does not exceed the threshold TH, the determination unit 413 skips the execution of the acquisition processing to wait until the next sampling timing arrives. The determination unit 413 then determines whether or not the performance of the heat radiation module 21 is deteriorated according to whether or not the pairs of the predetermined number can be acquired the fixed time period. For instance, if the pairs of the predetermined number can be acquired during the fixed time period, the determination unit 413 determines that the performance of the heat radiation module 21 is deteriorated.

During the fixed time period, the determination unit 413 may not determine the presence or absence of the deterioration in the performance of the heat radiation module 21 according to whether or not the pairs of the predetermined number during the fixed time period, but the determination unit 413 may further analyze the pairs of the predetermined number acquired during the fixed time period. That is, if the pairs of the predetermined number is acquired during the fixed time period, the determination unit 413 calculates the number of pairs in which the temperature difference $\Delta T$ made by subtracting the second temperature sample value (Tref) from the first temperature value (T1) exceeds the reference value K, and if the calculated number of the pairs exceeds the number of reference values, the determination unit 413 determines that the performance of the heat radiation module 21 is deteriorated.

The monitor processing by means of the determination unit 413 is executed for each time of detection in which the temperature difference unit 411 detects that the temperature difference $\Delta T$ exceeds the threshold value TH during the normal operation of the computer 10.

The temperature data storage processing unit 414 stores, as a set of temperature data, the pair groups of the first and the second temperature sample values acquired by the performance determination unit 413 for each time of execution of the monitor processing in a database 500. The database 500 is a storage device installed in the computer 10. As the elapsed days after the purchase of the computer 10 by a user increases, the number of sets of the temperature data to be stored in the database 500 increases. The failure sign detection unit 415 reads the plurality of sets of temperature data from the database 500 after the plurality of sets of temperature data are stored in the database 500. The detection unit 415 analyzes the read plurality of sets of temperature data to detect signs of failures in the heat radiation module 21 in accordance with a tendency of a temperature change in the heat generation device 22. For instance, the detection unit 415 grasps the tendency of the deterioration in the performance of the heat radiation module 21 from the plurality of sets of temperature data stored in the database 500 to detect the presence or absence of the signs of the failures. In this case, the detection unit 415 may predict a possibility when the failure in the heat radiation module 21 occurs in the future.

Figure 4:
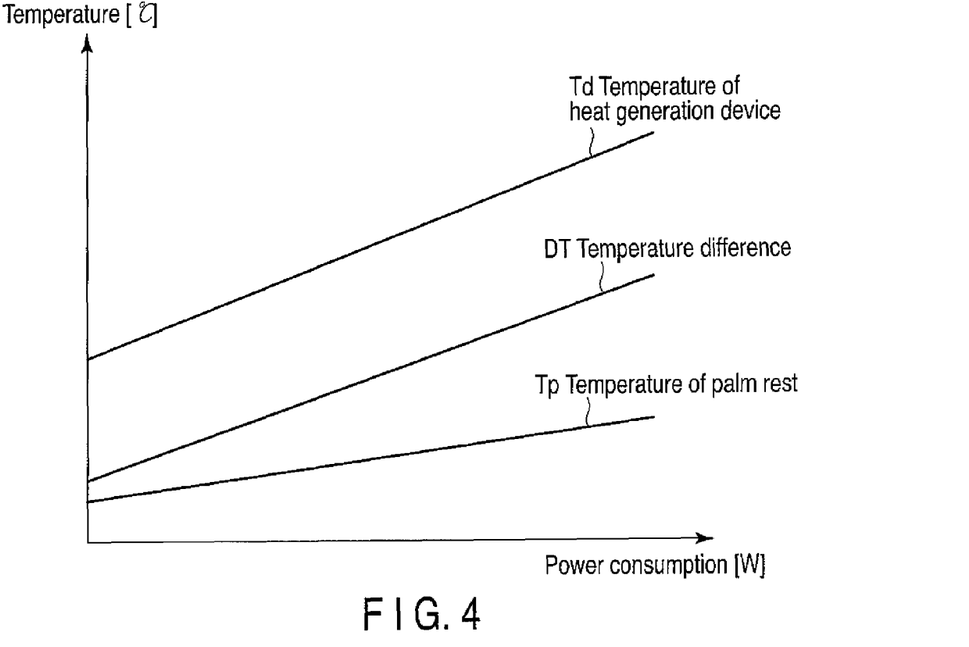
FIG. 4 is an exemplary view depicting a relationship between the power consumption of the information processor regarding the first embodiment of the invention and, a surface temperature of a palm rest, a temperature of a heat generation device, and a temperature difference in a housing.

Next, a method for setting a threshold will be described. FIG. 4 shows a relationship between the power consumption of the computer 10 and the temperature difference $\Delta T$, a temperature Tp of a palm rest, and a temperature Td of a heat generation device.

The larger the load on the heat generation device 22 becomes and the larger the power consumption becomes, the larger the power consumption of the computer 10 becomes.

That is, the larger the load on the heat generation device 22 becomes and the larger its power consumption becomes, the bigger the value of the temperature difference ΔT becomes in a linear function manner. Similarly, the larger the power consumption becomes, the bigger the temperature Tp at the palm rest becomes in the linear function manner. That is, it is conceivable that the three temperatures with respect to the power consumption are associated with one another.

Figure 5:
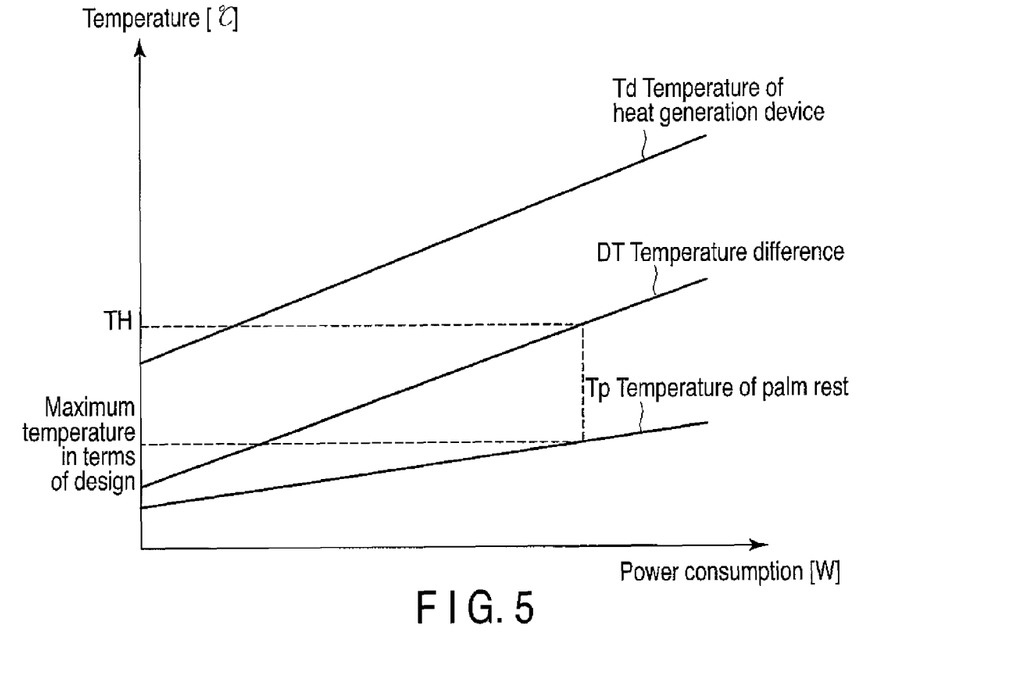
FIG. 5 is an exemplary view depicting a relationship between the power consumption of the information processor regarding the first embodiment of the invention and the surface temperature of the palm rest, and the temperature difference in the housing.

Therefore, the threshold TH may be decided on the basis of the temperature Tp of the palm rest, the temperature Td of the heat generation device 22, and the power consumption. For instance, as shown in FIG. 5, the threshold TH of the temperature difference ΔT is decided on the basis of the pre-measured temperature difference ΔT and the temperatures Tps of the palm rests 11a, 11B. For designing the housing 11, the temperature making the temperatures of the palm rests 11a, 11B maximum is designed in accordance with the heat generation amount in the housing 11. Therefore, the temperature difference ΔT at the time when the temperatures of the palm rests 11A, 11B become maximum is set as the threshold TH. If the temperatures of the palm rests 11A, 11B exceed the maximum temperature in design, namely, if the temperature difference ΔT exceeds the threshold TH, it may be conceivable that the cooling performance of the cooling mechanism is deteriorated. Here, while an example of setting the threshold TH on the basis of the temperatures of the palm rests 11A, 11B has been described, temperatures at anywhere other than the palm rests 11A, 11B can be usable as long as the temperatures of the surface of the housing 11. For instance, the temperatures on the surface on a lower side of the housing 11 can be usable.

Figure 6:
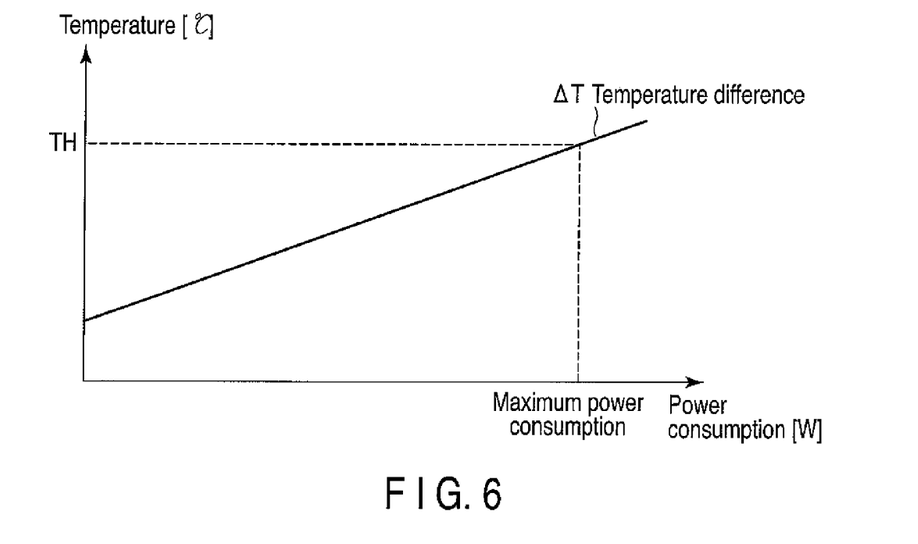
FIG. 6 is an exemplary view depicting a relationship between the power consumption of the information processor regarding the first embodiment of the invention and the temperature difference in the housing.

As shown in FIG. 6, the threshold TH of the temperature difference ΔT is decided on the basis of the pre-measured temperature difference ΔT and the power consumption. The maximum power consumption of the information processor is decided at the time of design. The cooling mechanism is designed so that the temperature of the inside of the housing 11 becomes not higher than the designed value if the power consumption is the maximum power consumption. Therefore, the temperature difference ΔT at the time when the power consumption becomes the maximum power consumption is set as the threshold TH. If the temperature difference ΔT exceeds the threshold TH, it is conceivable that the cooling performance of the cooling mechanism is deteriorated.

Figure 7:
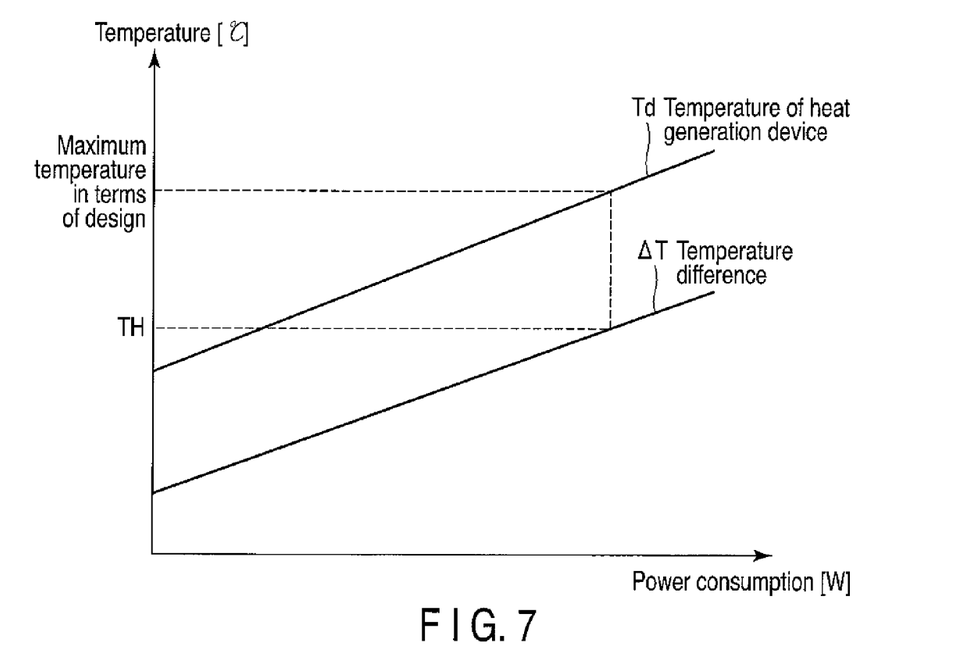
FIG. 7 is an exemplary view depicting a relationship between the power consumption of the information processor regarding the first embodiment of the invention and the temperature of the heat generation device and the temperature difference in the housing.

As shown in FIG. 7, the threshold TH of the temperature difference ΔT is decided on the basis of the pre-measured temperature difference ΔT and the temperature Td of the heat generation device 22. In a semiconductor chip such as the heat generation device 22, a normal operation limit temperature by which the heat generation device 22 operates normally is decided as a specification. Accordingly, the temperature difference ΔT when the temperature of the heat generation device 22 becomes the normal operation limit temperature is set as the threshold TH. When the temperature of the heat generation device 22 exceeds the normal operation limit temperature, namely, when the temperature difference ΔT exceeds the threshold TH, it is conceivable that the cooling performance of the cooling mechanism is deteriorated.

Three values are quoted as examples of the thresholds THs of the temperature differences ΔTs. The information processor uses one of these three thresholds THs. For instance, the threshold TH is selected in response to the user to be objected by the processor. In a case of a product targeted to an ordinary user, for instance, the threshold TH is set on the basis of the surface temperature of the housing 11 such as the palm rests 11A, 11B. When the surface temperature of the housing 11 such as the palm rests 11a, 11B become high, the user feel uncomfortable. Not to make the user feel uncomfortable, the threshold value TH is set on the basis of the surface temperature of the housing 11 such as the palm rests 11A, 11B.

In a case of a product which is assumed to be used at an office, not to reduce a processing speed as much as possible, the threshold TH is set on the basis of the temperature of the heat generation device 22 or the power consumption.

Figure 8:
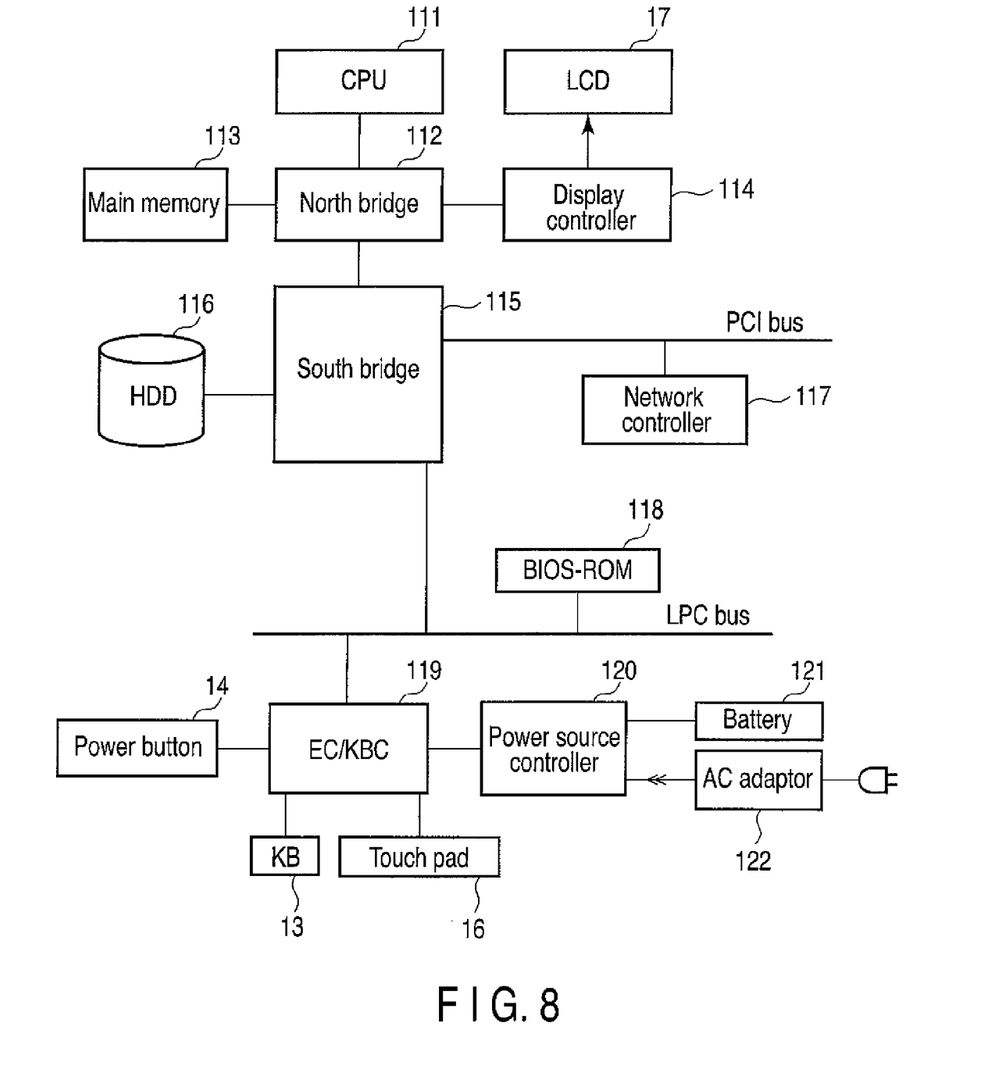
FIG. 8 is an exemplary block diagram depicting a system configuration of the information processor regarding the first embodiment of the invention.

Referring now to FIG. 8, the system configuration of the computer 10 will be described.

The computer 10 comprises a CPU 111, a north bridge 112, a main memory 113, a display controller 114, a south bridge 115, a hard disk drive (HDD) 116, a network controller 117, a flush basic input output system (BIOS)-ROM 118, an embedded controller/keyboard controller IC (EC/KBC) 119, a power source controller 120, etc.

The CPU 111 is a processor for controlling an operation of each component of the computer 10. The CPU 111 executes an operating system and various application programs/utility programs which are loaded in the main memory 113 from the HDD 116. The CPU 111 also executes a system BIOS which is stored in the flush BIOS-ROM 118. The system BIOS is a program for controlling hardware.

The north bridge 112 is a bridge device connecting the local bus of the CPU 111 to the south bridge 115. The north bridge also has a function of performing communication with the display controller 114 via an accelerated graphics port (AGP). Further, the north bridge 112 has a built-in memory controller for controlling the main memory 113.

The display controller 114 controls an LCD 17 to be used as a display monitor of the computer 10. The display controller 114 has a drawing computation function and functions as a graphics accelerator. The south bridge 115 is each connected to a peripheral component interconnect (PCI) bus and a low fin count (LPC) bus.

EC/KBC 119 is a one chip micro computer with an embedded controller for power management and a keyboard controller for controlling the KB 13 and the touch pad integrated therein. The EC/KBC 119 cooperates with the power source controller 120 to power on/power off the computer 10 in response to the operation of the power button 14 by the user. The power source controller 120 uses a battery 121 or an external power source to be supplied through an alternate current adapter 122 to generate the system power to be supplied to each component of the computer 10.

In the system of FIG. 8, for example, the CPU 111, the display controller 114, the north bridge 112, the HDD 116, etc., become heat radiation devices.

Figure 9:
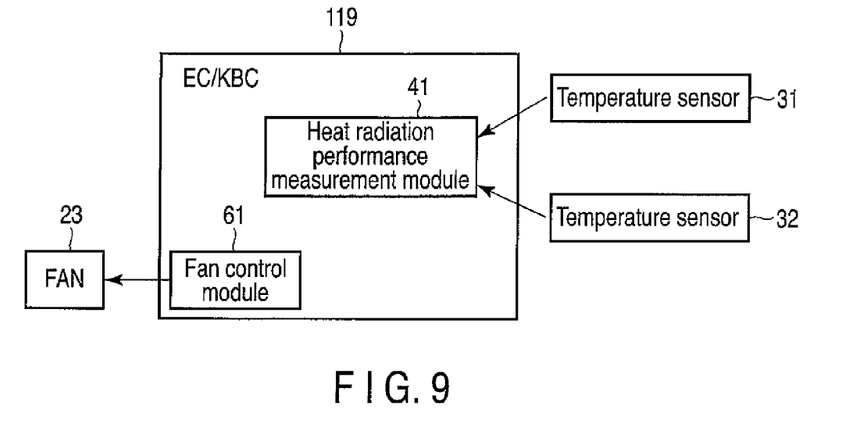
FIG. 9 is an exemplary block diagram depicting a configuration example of a cooling mechanism to be employed to the system configuration of FIG. 8.

Hereinafter, an example of a cooling mechanism to be employed to the system of FIG. 8 will be described with reference to FIG. 9.

The aforementioned heat radiation performance measurement unit 41 may be mounted, for example, in the EC/KBC 119. In the EC/KBC 119, a fan control unit 61 is also installed.

Figure 10:
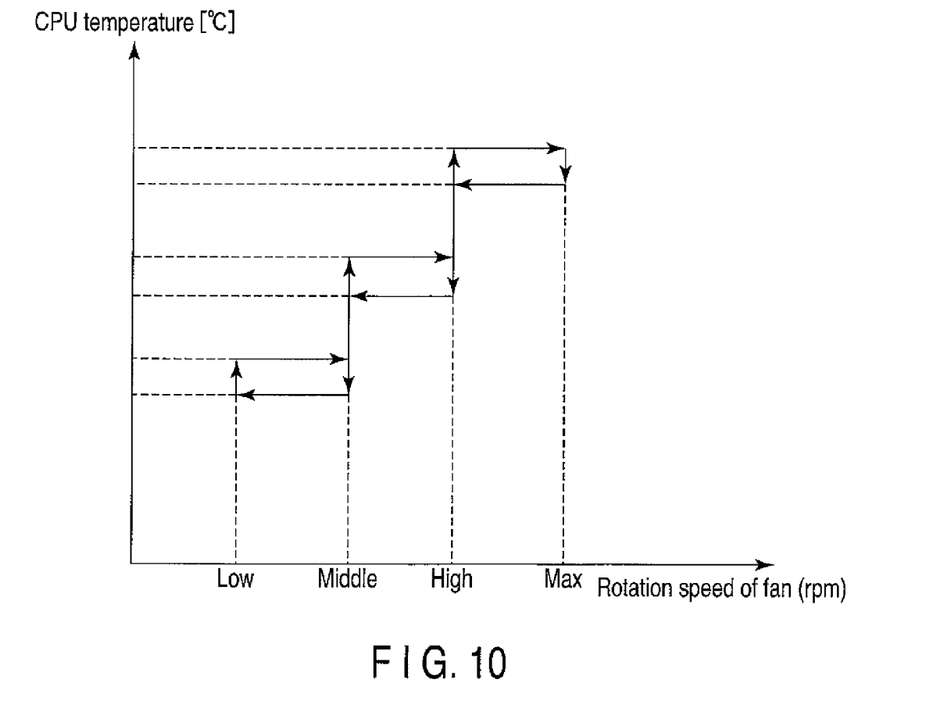
FIG. 10 is an exemplary view depicting a relationship between a temperature of a CPU and the rotation speed of a fan.

The fan control unit 61 switches the rotation speed of the fan 23 step by step in response to an absolute temperature of the CPU 111 to control heat radiation ability. As shown in FIG. 10, the rotation speed of the fan 23 is reported to the fan control unit 61 in the EC/KBC 119 via the BIOS in response to the temperature measurement value to be measured by the measurement circuit in the CPU 111, and the fan control unit 61 controls the rotation speed of the fan 23. In the first embodiment, the heat radiation function is controlled by changing the rotation speed of the fan 23 step by step in response to the temperature of the CPU 111.

Some functions of the above heat radiation performance measurement unit 41 can be realized by the program which is executed by the CPU 111.

Figure 11:
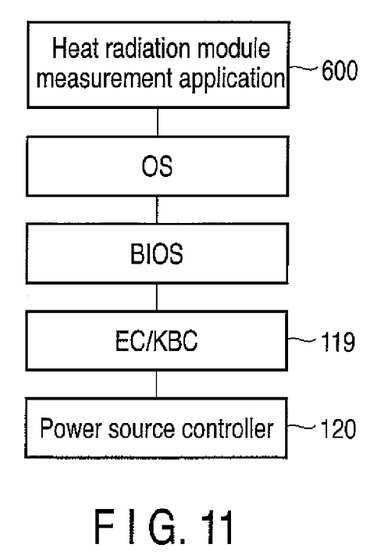
FIG. 11 is an exemplary block diagram depicting a relationship between hardware and software corresponding to a case, where some functions of the heat radiation performance measurement device depicted in FIG. 3, is realized by the software.

FIG. 11 shows a relationship between hardware and software corresponding to the case where some functions of the heat radiation performance measurement unit 41 are realized by the program.

The power source current value flowing through the fan 23 is fed to the EC/KBC 119 from the power source controller 120. The EC/KBC 119 is equipped, for instance, with the temperature difference detection unit 411 of FIG. 3. When the temperature difference ΔT exceeds the threshold TH, the EC/KBC 119 generates an event for starting the monitor processing. The event is transferred to a heat radiation module measurement application program 600 through the BIOS and the OS. The application program 600 has a function of corresponding to each of the temperature data acquisition unit 412, the performance determination unit 413, the temperature data storage processing unit 414 and the failure sign detection unit 415.

Figure 12:
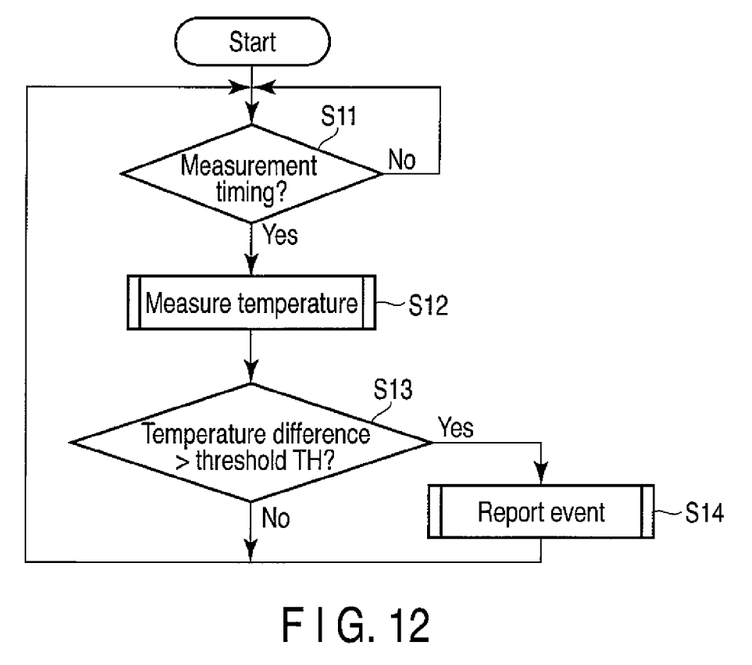
FIG. 12 is an exemplary flowchart depicting a procedure of temperature difference detection processing to be executed by the information processor regarding the first embodiment of the invention.

Referring next to the flowchart of FIG. 12, a procedure of temperature difference detection processing to be executed by the EC/KBC 119 will be described.

The detection unit 411 in the EC/KBC 119 executes the following processing during the time period in which the computer 10 is in a power-on state. That is, the EC/KBC 119 executes temperature measurement processing for acquiring a detected temperature from each of the temperature sensors 31, 32 for each fixed time interval (Blocks S11, S12). The EC/KBC 119 subtracts the temperature Tref sensed by the temperature sensor 32 from the temperature T1 sensed by the temperature sensor 31 to calculate the temperature difference ΔT. The EC/KBC 119 then determines whether or not the temperature difference ΔT exceeds the threshold TH (Block S13).

If the temperature difference ΔT exceeds the threshold TH (YES, Block S13), the EC/KBC 119 generates an event for instructing the start of the monitor processing to instruct the start of the monitor processing to the application program 600 (Block S14). In Block S14, the EC/KBC 119 generates, for example, an interruption signal to the CPU 111, and thus, reports the generation of the event to the application program 600 through the BIOS and the OS.

Next, a procedure of monitor processing to be executed through the heat radiation module measurement application program 600 will be described with reference to the flowchart of FIG. 13.

When receiving the above event, the application program 600 starts the following processing. At first, an outline of the monitor processing will be explained.

When receiving the event from the EC/KBC 119, the application program 600 reads, form the EC/KBC 119, the pair (sample data) containing the first temperature sample value indicating the temperature sensed by the temperature sensor 31 and the second temperature sample value indicating the temperature sensed by the temperature sensor 32.

This sample data read processing is repeatedly executed for each fixed time interval (e.g., for each three minute). The sample data read processing is repeated until 40 pieces of sample data (40 pairs of sample data) are collected. Therefore, at least during 120-second period (monitor period), the monitor processing is continued. When the 40 pieces of sample data is collected, the application program 600 determines whether or not the performance of the heat radiation module 21 is deteriorated on the basis of the 40 pieces of sample data.

Hereinafter, an example of concrete monitor processing will be described.

The CPU 111 performs the following processing under the control through the heat radiation module measurement application program 600.

The CPU 111 firstly initializes a value of a counter for counting the number of acquired items of sample data (Block S21). Next, the application program 600 reads the first temperature sample value (T1) and the second temperature sample value (Tref) from the EC/KBC 119 (Block S22), and determines whether or not the temperature difference ΔT between the first temperature sample value (T1) and the second temperature sample value (Tref) exceeds the threshold TH (Block S23).

If the temperature difference ΔT exceeds the threshold TH (YES, Block S23), the CPU 111 performs processing for acquiring the read first temperature sample value (T1) and the read second temperature sample value (Tref) as valid sample data (Block S24). In Block S24, the CPU 111 stores the first temperature sample value (T1) and the second temperature sample value (Tref) in the memory 113, and also increments the value of the counter by one.

If the temperature difference ΔT is not larger than the threshold TH (NO, Block S23), the CPU 111 skips the acquisition processing in Block S24.

After the execution of the acquisition processing in Block S24, the CPU 111 determines whether or not the value of the counter exceeds 40 (Block S25). If the value of the counter is not larger than 40 (NO, Block S25), or if the temperature difference ΔT is not larger than the threshold TH in Block S23 (NO, Block S23), the CPU 111 determines whether or not a fixed time-out time (e.g., five minutes) from the reception of the event has elapsed (Block S29). If the fixed time-out time from the reception of the event has not elapsed (NO, Block S29), the CPU 111 waits until the time point when the next sampling timing arrives, namely, until the time point when three-second has lapsed from the last temperature reading (Block S30). If the three-second has lapsed from the last temperature reading (YES, Block S30), the CPU 111 starts again the processing from Block S22.

If the value of the counter exceeds 40 until the fixed time-out time has elapsed from the reception of the event, namely, if the 40 pieces of sample data have acquired (YES, Block S25), the CPU 111 determines whether or not the performance of the heat radiation module 21 is deteriorated on the basis of the 40 pieces of sample data (40 pairs of the first temperature sample value T1 and the second temperature sample value Tref) (Block S26).

Each of the 40 pieces of sample data is the data which has been acquired under a heavy load on the computer 10 (period satisfying a condition of ΔT>TH), and the data is used as data for examining how much extent the temperature of the heat radiation device 22 exceeds that of the housing 11.

Even if the performance of the heat radiation module 21 has been deteriorated, it is hard to check the influence due to the deterioration of the performance under a low load. In the first embodiment, since the performance of the heat radiation module 21 is evaluated by using the sample data acquired under the high load (the period satisfying the condition of ΔT>TH) on the computer 10, the performance of the heat radiation module 21 can be correctly evaluated.

In Block S26, the CPU 111 calculates, for example, the temperature difference ΔT for each of all the pairs to determine whether or not the temperature difference ΔT exceeds the reference value K. The CPU 111 determines the presence or absence of the deterioration in the performance of the heat radiation module 21 in accordance with the frequency of the generation of the pairs of which the temperature differences ΔTs exceed the reference value K. More specifically, if the number of pieces of pairs of which the temperature differences ΔTs exceed the reference value K exceeds a certain reference number, the CPU 111 determines that any failure has occurred in the heat radiation module 21 and the performance of the heat radiation module 21 has been deteriorated.

If the deterioration in the performance of the heat radiation module 21 is detected (NG, Block S26), the CPU 111 performs processing for reporting the deterioration in the performance of the heat radiation module 21 to the user (Block S27). In Block S27, the CPU 111 displays a message screen for reporting the deterioration in the performance of the heat radiation module to the user. More specifically, the CPU 111 executes processing, for example, 1) processing of displaying a message screen showing the necessity of maintenance of the heat radiation module 21 on the display screen of the LCD 17; 2) processing of displaying a message screen guiding a maintenance procedure of the heat radiation module 21 for the user; and 3) processing of displaying a message screen prompting a start of a check program dedicated to performance measurement of the heat radiation module 21. The CPU 111 may calculate a ratio of current heat radiation performance to heat radiation performance in normal time of the heat radiation module 21, and may display the ratio on the message screen.

After this, the CPU 111 waits a user operation to the message screen (Block S28), and executes processing of closing the message screen, processing of guiding the maintenance procedure, or processing of starting the dedicated check program in response to the operation by the user.

Figure 13:
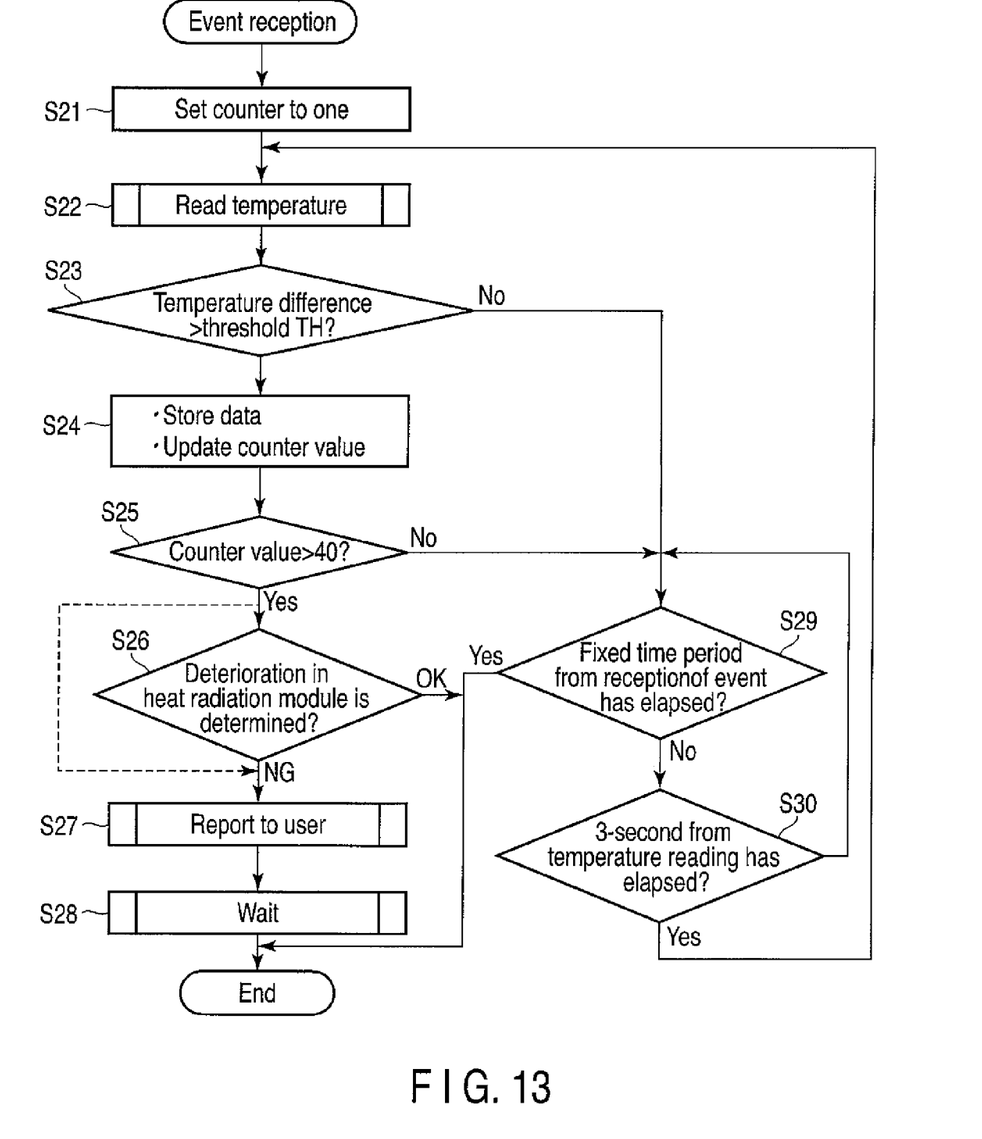
FIG. 13 is an exemplary flowchart depicting a procedure in monitor processing to be executed by the information processor regarding the first embodiment of the invention.

As shown by a doted line in FIG. 13, the CPU 111 may determine that the performance of the heat radiation module 21 is deteriorated on the condition that the value of the counter exceeds 40 until the fixed time-out time has lapsed from the reception of the event.

Figure 14:
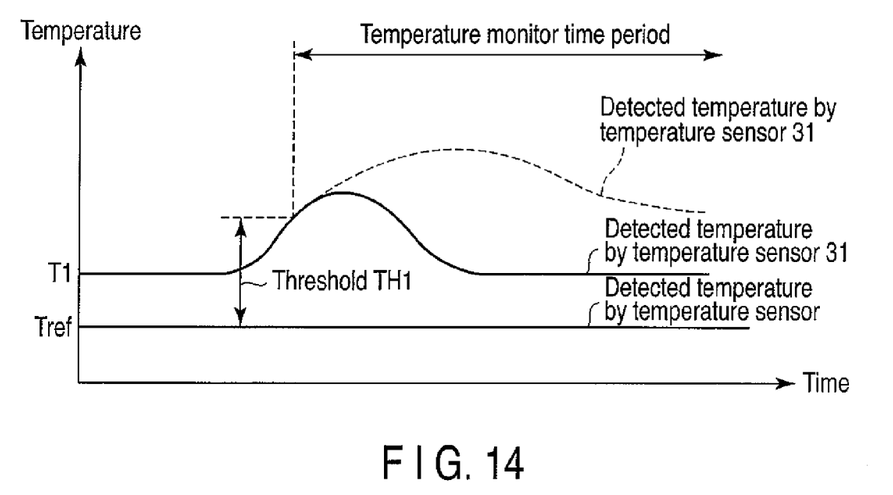
FIG. 14 is an exemplary view depicting an example of a temperature change in the heat generation device installed in the information processor regarding the first embodiment of the invention.

FIG. 14 shows an example of a change in the temperature of the heat generation device 22 under variations in load.

When the load on the heat generation device 22 drastically becomes heavy, the detected temperature (board temperature near the heat generation device 22) by the temperature sensor 31 also drastically increases. When the temperature difference ΔT exceeds the threshold TH, the monitor processing by the application program 600 is started in response to the event from the EC/KBC 119.

If the heat radiation module 21 operates normally, air at a high temperature is radiated to the outside by means of the operation of the heat radiation module 21. Therefore, the detected temperature (the reference temperature near the heat generation device 22) by the temperature sensor 31 is lowered to be kept within a range of a stationary temperature.

In this way, even if the performance of the heat radiation module 21 is normal, the temperature difference ΔT may exceed the threshold TH in accordance with the variations in a load of the heat generation device 22.

If the performance of the heat radiation module 21 is deteriorated, it takes a long time to radiate the air at the high temperature to the outside because of a shortage of the heat radiation ability of the heat radiation module 21. Therefore, if the temperature difference ΔT exceeds the threshold TH once due to the rise of the load on the heat generation device 22, the detected temperature (the temperature of the heat generation device 22) of the temperature sensor 31 becomes hard to be lowered as shown by the dotted line in FIG. 14.

In the embodiment, the temperature difference ΔT is continuously monitored during the fixed time period after the time point when the temperature difference ΔT has exceeded the threshold TH. Thus, the processor can prevent the temperature change, which the temperature difference ΔT exceeds the threshold TH, from being erroneously determined as the deterioration in the performance of the heat radiation module 21.

In the computer 10, the variations in load of the heat generation device 22 are frequently generated. Therefore, even if the performance of the heat radiation module 21 is normal, phenomena, in which the temperature differences ΔTs temporarily exceed the thresholds THs, may generate in succession.

In the embodiment, since the processor determines the performance of the heat radiation module 21 on the basis of the number of pairs in which the temperature differences ΔTs exceed the reference value K (K>TH), even if the phenomena in which the temperature differences ΔTs temporarily exceed the thresholds THs generate in succession, the processor can prevent the generation from being erroneously determined as the deterioration in the performance of the heat radiation module 21.

As described above, in the embodiment, the processing of monitoring the temperature difference between the heat generation device and the temperature in the housing is continuously executed for the fixed time period by using the generation of the event in which the temperature difference between the heat generation device and the temperature in the housing exceeds the threshold as a trigger. According to the monitor processing, the processor can prevent the temporary raise of the load from being erroneously determined as the deterioration in the performance of the heat generation module.

The invention is not limited to the specific details and representative embodiments shown and described herein, and in an implementation phase, this invention may be embodied in various forms without departing from the spirit or scope of the general inventive concept thereof. Various types of the invention can be formed by appropriately combining a plurality of constituent elements described in the foregoing embodiments. Some of the elements, for example, may be omitted from all the constituent elements shown in the embodiments mentioned above. Further, the constituent elements over different embodiments may be appropriately combined.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus, comprising:
   a housing;
   a printed-circuit board in the housing;
   a heat generator on the printed-circuit board;
   a heat radiator in the housing configured to radiate heat from the heat generator to the outside of the housing;
   a first thermometer in the housing configure to sense a first temperature at a first position on the printed-circuit board;

a second thermometer on the printed-circuit board, configured to sense a second temperature at a second position away from the heat generator than the first position;
a temperature difference processor configured to compute a temperature difference between the first temperature and the second temperature; and
a cooling performance determination module configured to monitor whether the temperature difference is above a threshold, and to determine whether performance of the heat radiator is deteriorated based on a result of the temperature difference monitoring, wherein the threshold is at least one of:
the temperature difference computed when a measured temperature of the housing is in a predetermined high range;
the temperature difference computed when power consumption of the heat generator is substantially high;
the temperature difference computed when a temperature of the heat generator is beyond a predetermined normal operating limit temperature; and
a keyboard on an upper face of the housing configured to enter data, wherein a temperature of the housing is a temperature at a front side of the keyboard.

2. The apparatus of claim 1, wherein
the cooling performance determination module is configured to repeatedly monitor pairs of the first temperature and the second temperature at predetermined time intervals during a predetermined time period, and to determine whether the performance of the heat radiator is deteriorated based on pairs sampled during the predetermined time period.

3. The apparatus of claim 2, wherein the performance determination module is configured to calculate a number of pairs comprising temperature differences obtained by subtracting the second temperature from the first temperature in each pair during the predetermined time period, and configured to determine whether the performance of the heat radiator is deteriorated based on the number of pairs.

4. The apparatus of claim 2, further comprising:
a temperature data storage processor configured to store the pairs of the first temperature and the second temperature obtained by the cooling performance determination module for each monitoring as a set of temperature data in a storage device; and
a failure detection module configured to analyze temperature data of a plurality of sets after storing the temperature data of the plurality of sets, and to detect a failure of the heat generator from a tendency of a temperature change at the first position.

5. The apparatus of claim 1, wherein
the cooling performance determination module is configured to determine whether the temperature difference is above the threshold for each predetermined time interval, to detect pairs of the first temperature and the second temperature at predetermined time intervals when the temperature difference is above the threshold, and to determine whether the performance of the heat radiator is deteriorated according to whether a predetermined number of pairs are sampled during the predetermined time period.

6. The apparatus of claim 1, wherein
the cooling performance determination module configured to determine whether the temperature difference is above the threshold for each predetermined time interval, to sample pairs of the first temperature and the second temperature at the predetermined time intervals on a condition that the temperature difference is above the threshold, to calculate the number of pairs comprising differences between the second temperatures and the first temperatures above a reference value in pairs of a predetermined number, and to determine that the performance of the heat radiator is deteriorated when the calculated number of pairs is above a reference number.

7. The apparatus of claim 1, wherein
the heat radiator further comprises:
a heat radiating fin at a position in the housing facing an air outlet in the housing and thermally connected to the heat generator; and
a fan configured to cool the heat radiating fin.

8. The apparatus of claim 1, wherein
the heat generator comprises a central processing unit.

9. A cooling performance determination method of determining cooling performance of a heat radiator discharging heat from a heat generator installed in a housing to the outside, the method comprising:
sensing a first temperature at a first position on a printed-circuit board with the heat generator on the printed-circuit board and a second temperature at a second position away from the heat generator than the first position on the printed-circuit board;
computing a temperature difference between the first temperature and the second temperature; and
monitoring the temperature difference during a predetermined time period from when the temperature difference is above the threshold; and
determining whether performance of the heat radiator is deteriorated based on the result of the monitoring,
wherein the threshold is at least one of:
the temperature difference computed when a measured temperature of the housing is in a predetermined high range, wherein a measured temperature of the housing is a temperature at a front side of a keyboard on an upper face of the housing;
the temperature difference computed when power consumption of the heat generator is substantially high; and
the temperature difference computed when a temperature of the heat generator is beyond a predetermined normal operating limit temperature.

\* \* \* \* \*